UNITED STATES PATENT OFFICE.

PAUL NAWIASKY, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE COMPOUND.

1,238,932.  Specification of Letters Patent.  Patented Sept. 4, 1917.

No Drawing.  Application filed May 8, 1915. Serial No. 26,845.

*To all whom it may concern:*

Be it known that I, PAUL NAWIASKY, a citizen of the Austrian Empire, residing at Ludwigshafen-on-the-Rhine, Germany, have invented new and useful Improvements in Anthraquinone Compounds, of which the following is a specification.

I have found that valuable anthraquinone compounds can be produced by reacting on an anthraquinone beta sulfonic acid body—which term comprises an anthraquinone, either unsubstituted or substituted, containing in at least one beta position a sulfonic acid residue, either free or in the form of sulfonic salt or sulfoarylid or otherwise substituted—with an aromatic amin of the benzene, or naphthalene, series in the presence of strong alkali (which term includes caustic alkali and alkali alcoholates), until the sulfonic acid residue substantially is split off. I prefer to carry out the reaction in the presence of an oxidizing agent, e. g. of air or a solid agent such as potassium chlorate. The products obtained by the present process are anthraquinone-beta-arylids and are insoluble in water, dilute acids and alkalis, soluble in organic solvents and in concentrated sulfuric acid, the solutions in the latter turning, when heated, into blue or bluish violet; they are of great value as starting materials for the manufacture of coloring matters. For instance, when treated with sulfonating agents, they yield wool dyes with good properties. Of said anthraquinone-beta-arylids I only claim as new products those which do not contain a hydroxylated anthraquinone residue.

The following examples will serve to further illustrate the nature of this invention which however is not confined to these examples. The parts are by weight.

Example 1.

Heat about one thousand parts of anilin to boiling point, and, after any water that may have been dissolved therein has distilled off, add thirty parts of powdered caustic soda and one hundred parts of anthraquinone-2-sulfo acid sodium salt. Keep the mixture boiling for about five hours, preferably while well stirring, and passing an ample current of air through the mass. After cooling, remove the excess of anilin by dissolving it in dilute hydrochloric acid and extract the insoluble residue with dilute alcohol, and dry it and recrystallize it, for instance, from mono-chlor-benzene. By working in this way red crystalline needles of the new 2-phenyl-amino-anthraquinone are obtained which melt at from 234° to 236° centigrade. In this example caustic potash can be used instead of caustic soda, or mixtures of both alkalis can be used, and the alkali alcoholates can be used, either alone or in admixture. Further other salts, or derivatives, of anthraquinone-2-sulfo acid, or the free acid, can be used instead of the sodium salt, for instance, the anilin salt, or the anilid, can be employed. Instead of anilin other amino compounds of the benzene, or naphthalene, series can be employed. Thus from para-toluidin the 2-para-tolyl-amino-anthraquinone can be produced in the form of crystals having a melting point of from 234° to 235° centigrade. Similarly from para-chlor-anilin the 2.4'-chlor-phenyl-amino-anthraquinone can be produced as crystals having a melting point of from 302° to 303° centigrade. Instead of using air as an oxidizing agent during the reaction other oxidizing agents may be used, for instance a solid oxidizing agent such as potassium chlorate.

Example 2.

Heat six hundred parts of anilin to about 180° centigrade, and add twelve and a half parts of powdered caustic soda and fifty parts of 2-chlor-anthraquinone-7-sulfo acid sodium salt. Maintain the temperature for four hours at 180° centigrade while passing an ample current of air through the melt. Free the product from anilin and, if necessary, from hydroxy-anthraquinones, and recrystallize from boiling anilin. Violet to orange colored needles of the corresponding anilid are thus obtained which melt at from about 276° to 277° centigrade. Other substituted anthraquinone-2-sulfo acids can be used in a similar manner.

Now what I claim is:

1. The process of producing anthraquinone compound consisting in reacting on an anthraquinone-beta-sulfonic acid body with an amino compound of the benzene, or naphthalene, series in the presence of strong alkali, until the sulfonic acid residue is essentially split off.

2. The process of producing anthraquinone compounds consisting in reacting on an anthraquinone-beta-sulfonic acid body with an amino compound of the benzene, or naphthalene, series in the presence of strong alkali and of an oxidizing agent, until the sulfonic acid residue is essentially split off.

3. The new compounds of the anthracene series being anthraquinone-beta-arylids of the formula:

$$A—NH—R$$

in which A is an anthraquinone residue free from sulfuric acid groups and from hydroxyl groups, while R means an aromatic residue containing less than fourteen carbon atoms, which compounds are insoluble in water, dilute acids and alkalis, soluble in organic solvents and in concentrated sulfuric acid, the solutions in the latter turning, when heated, into blue or bluish violet.

In testimony whereof I have hereunto set my hand in the presence of two subscribing witnesses.

PAUL NAWIASKY. [L. S.]

Witnesses:
ARTHUR DENONVILLE,
RUTH P. MANN.